Figure 1:
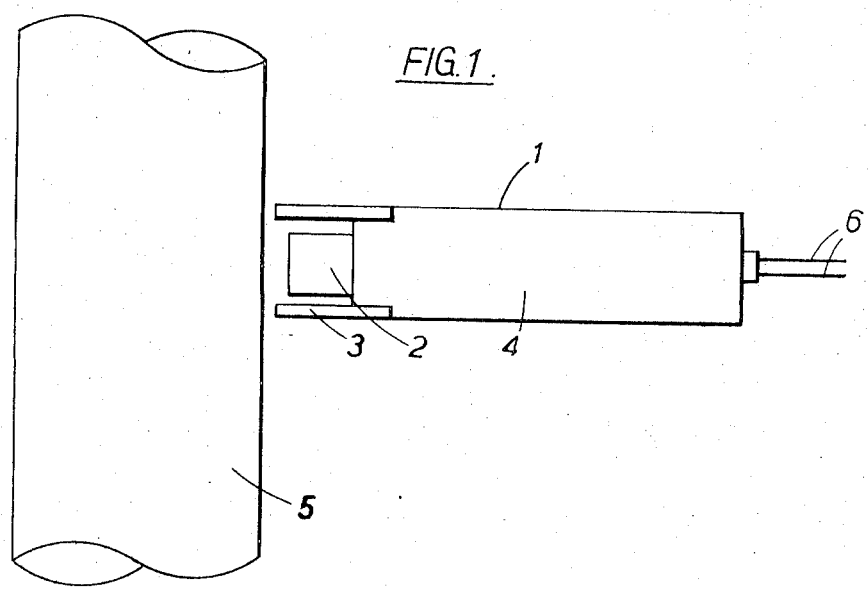

United States Patent [19]

McDonnell

[11] 3,845,660

[45] Nov. 5, 1974

[54] DETECTION OF VELOCITIES OF FLUIDS IN CONDUITS

[75] Inventor: Neil Patrick Hugh McDonnell, Stockton-on-Tees, England

[73] Assignee: Imperial Chemical Industries Limited, London, England

[22] Filed: Jan. 25, 1972

[21] Appl. No.: 220,655

[30] Foreign Application Priority Data
- Feb. 5, 1971  Great Britain........................ 4035/71
- Apr. 5, 1971  Great Britain........................ 8658/71
- Oct. 20, 1971  Great Britain...................... 48714/71

[52] U.S. Cl. .............................. 73/194 E, 73/194 A
[51] Int. Cl. ............................................... G01f 1/00
[58] Field of Search .......... 73/194 A, 194 B, 194 E, 73/194 F

[56] References Cited
UNITED STATES PATENTS

| | | | |
|---|---|---|---|
| 2,515,221 | 7/1950 | Henning | 73/194 A X |
| 2,760,184 | 8/1956 | Beattie | 73/194 A X |
| 3,204,457 | 9/1965 | Howatt | 73/194 A |
| 3,204,458 | 9/1965 | Gillen | 73/194 A |
| 3,229,509 | 1/1966 | Darby | 73/71.4 |
| 3,253,457 | 5/1966 | Pakala et al. | 73/71.4 |
| 3,580,092 | 5/1971 | Scarpa | 73/194 B |
| 3,588,699 | 6/1971 | Pysnik | 73/194 E X |
| 3,635,082 | 1/1972 | Prellwitz et al. | 73/194 M |

OTHER PUBLICATIONS

Beck et al., "Particle Velocity, & Mass Flow Measurement in Pneumatic Conveyors," Powder Technology, 2(1968/69) pp. 269–277.

Primary Examiner—Charles A. Ruehl
Attorney, Agent, or Firm—Cushman, Darby & Cushman

[57] ABSTRACT

Apparatus for detecting the velocity of a fluid in a conduit comprises a directional sonic detector directed at but spaced away from the conduit. arrangement cuts down reception of background noise.

2 Claims, 2 Drawing Figures

PATENTED NOV 5 1974

3,845,660

DETECTION OF VELOCITIES OF FLUIDS IN CONDUITS

This invention relates to the detection of velocities of fluids in conduits.

It has been proposed previously to use sonic detectors contacting the walls of conduits to provide an indication of the flow of fluids whether gases, liquids or particulate fluids (i.e., slurries of particles in liquid or particles which are fluidised in a gas stream) through conduits. We have found that providing the sound sensitive element of the sonic detector is directed toward the conduit but spaced away from the conduit, the sound picked up by the detector more closely represents the sound produced at that point than if the detector contacts the conduit. This discovery is of considerable importance since it is normal for a substantial amount of background noise to be transmitted along conduits from distant parts of apparatus of which the conduits form part.

The invention, therefore, comprises apparatus for detecting the velocity of a fluid in a conduit which comprises a directional sonic detector directed toward the conduit but of which the sound sensitive element is spaced away from and fixed in relation to the conduit. The detector is preferably shielded from extraneous airborne noises.

The detector may be fixed in relation to the conduit. This may suitably be achieved by securing it to an independent support or to the conduit itself. Sound absorbing material should then be present between the sound sensitive element and the conduit so as to prevent the passage of sonic vibration to the sound sensitive element from the conduit. The sound absorbing material may be in the body of the directional sonic detector, the detector may be held by a mounting of sound absorbing material (for example rubber), or the mounting may be itself supported by sound absorbing material.

In general velocities of fluids are determined as linear velocities, but in a modification of the invention they may be determined as mass flows.

The sonic detector is preferably an ultrasonic detector sensitive to frequencies produced in the conduit which may be in the range 0.5 to 250 kHz, for example, 2 to 50 kHz. Particularly suitable frequencies are in the range 36 to 44 kHz. The detector may have a broader range of sensitivity, an overlapping range of sensitivity or a range of sensitivity within the above ranges, but should preferably be sensitive to some frequencies within them. The detector is preferably insensitive to any resonant frequencies occurring in the conduit if possible.

The sensitive element of the detector is preferably as close to the conduit as possible providing it does not contact the conduit. If desired a shield of sound absorbing material may surround the sensitive element and contact the conduit, thus acting as a spacer and a shield against external noise, but the shield must in this case be of material which is sufficiently sound absorbing not to transmit sound from the conduit to the sensitive element.

The sensitive element may be, for example, 1 mm. to 1 m. from the conduit and is normally 3 to 30 mm. from the conduit. The sensitive element may be surrounded by a shield of considerable length projecting from it towards the conduit if the conduit is distant, as such a shield as a collimating effect enabling sound to be picked up from a restricted portion of the conduit only.

The total sound detected by a single detector may be used as a crude measure of the velocity of the fluid. However, due to fluctuations in physical properties of the fluid, for example particle size, temperature, viscosity or particle density, the volume of sound detected at a given point is not constant for any given velocity of the fluid, but varies according to the physical properties of the fluid at the point at that time. In effect, the sound waves, which are of high frequency, are modulated by low frequency variations in intensity of the sound.

As the fluid passes down the conduit, similar modulations, i.e., variations in sonic intensity, are reproduced at other points after time lags representing the time taken for the fluid to pass from the given point to the other points, as fluctuations in physical properties take some time to be lost. The lower the frequency of such modulations, the longer they tend to persist.

The reduction of background noise detection made possible by this invention now makes it possible to determine the velocity by securing two signals at points spaced apart along a conduit, and by matching the signals received from the two points at varying time lags between them, to determine the time lag which gives the best match. The time lag represents the time taken by fluid contacting the walls of the conduit to travel from one point to the other and knowing the distance between the points one can determine the velocity of the fluid without necessitating any interference with the conduit itself. The invention enables measurements of flow in the region of the walls of the conduit to be made. The total flow in the conduit may be obtained by calibrating the apparatus, though calibration may be unnecessary if the rate of flow is uniform within the desired accuracy of measurement across the conduit. In the case of turbulently flowing fluids the total flow rate is in general more closely represented by the flow rate in the region of the walls than in other cases.

According, therefore, to a further feature of this invention two sonic detectors are directed toward the conduit at points spaced apart and the sensitive elements of both detectors are spaced away from the conduit.

The signals are preferably matched by deriving a signal representing the intensity of the detected sound at both points and correlating, e.g. by procedures similar to those hitherto used for detecting the flow of fluids inside conduits by taking temperature measurements at points spaced apart along the conduits and described by K. P. Termatt in Journal of Physics E: Scientific Instruments 1970, Vol. 3, Pages 589 – 593, by P. G. Bentley and G. D. Dawson in Transactions of the Society of Instrument Technology 1966, Pages 183 – 193, and A. Plaskowski and M. Beck in International Chemical Engineering, Vol. 9, No. 3, 1969, Pages 418 – 422. If gas velocities in conduits are to be detected as above described using two detectors it is preferred that the conduit be coated with sound absorbing material between the detectors to absorb sound transmitted along the conduit.

If the fluid is a gas the pipe between the detectors is preferably coated with a sound absorbing layer which provides a good accoustic match to the pipe.

The aforesaid apparatus may be used in conjunction with a density measuring instrument. By multiplying the density of the fluid by its velocity, its rate of mass flow may be determined. Such a calculation may take the form of dividing the density by a time lag determined as above described and multiplying by the spacing between the points without separately calculating the velocity if desired.

Suitable density measuring instruments include devices which are sensitive to the dielectric properties of the fluid which vary with its density, or in the case of fluids which are gases or liquids, instruments of which a component vibrates in the fluid and which are sensitive to the damping of vibration of the said component, which varies with the density of the fluid. It is, however, preferred to use devices which pass radiation from a source to a detector through the conduit, the radiation being partly absorbed by the fluid according to its density. Any radiation which passes through the walls of the conduit and is absorbed by the fluid, for example in many cases γ or X radiation, may be employed. If desired radiation may be passed through the fluid only (without passing through the walls of the conduit); in this case the walls of the conduit should be formed to receive the source and detector of such radiation so that the flow of fluid is not disturbed for the particular fluids and geometries involved.

If the signals of two detectors spaced apart along the conduit are to be matched at varying time lags, this may be done in various ways. Signals derived directly or indirectly from each detector may be recorded simultaneously and the recording examined subsequently. Such recording is preferably carried out on a stereo tape recorder, one stereo track being used for each detector signal. If the signals are not of a frequency to which the recorder is sensitive, the frequency can be altered to a suitable value by, for example, heterodyning to reduce the frequency, or (if for example, a demodulated signal of low frequency is to be stored) feeding the signal through a frequency modulator and storing the frequency modulated signal so produced. This method of storage normally requires demodulation of the stored signals before the signals can be compared.

The signals may also be fed directly to a signal correlator which may function by delaying the upstream signal, for example by storing it in analogue or digital form, multiplying it by the downstream signal and integrating the product. If the upstream signal be delayed by a number of different time lags, the time lag producing the greatest value of this integrated product corresponds to the time taken for fluid to pass between the positions on the conduit which the detectors are sensing. The results of this operation may be displayed graphically, for example, on a cathode ray oscilloscope, and interpreted by an operator, or may be interpreted by a computer which may also, if a mass flow rate is to be determined, multiply the density by the velocity of the fluid.

The invention comprises a method of controlling a manufacturing process in which a fluid passes down a conduit, which comprises directing a directional sonic detector toward the conduit but spacing the sound sensitive element away from the conduit, detecting the velocity of the fluid and taking steps to change the velocity of the fluid through the conduit in response thereto.

The steps to change the velocity of the fluid through the conduit may include, if a blockage has been detected, by-passing the conduit, closing down the process or taking steps to clear the blockage, for example by blowing the line through or by disconnecting the conduit to permit mechanical clearance of the blockage to be effected. If a rate of flow falling outside the range of desired values is detected the operation of the manufacturing process may be adjusted, for example in the case of a plant carrying out a chemical reaction, by altering the temperature, pressure or residence time to restore the rate of flow to a desired value.

The invention also comprises apparatus for giving an alarm signal in response to a predetermined condition of flow or lack of flow of a fluid in a conduit which comprises a directional sonic detector directed toward a conduit, of which the sound sensitive element is spaced away from the conduit, and means for giving an alarm signal in response to a predetermined signal or lack of signal derived from the sonic detector.

One form of the invention will now be described with reference to

Figure 2:
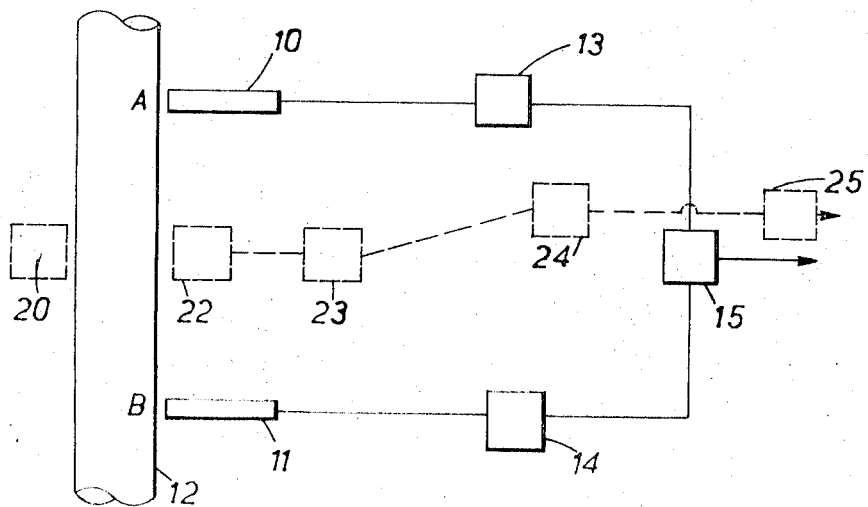

FIG. 1 which represents in elevation (not to scale) a directional sonic detector directed toward a conduit, part of the acoustic shield being cut away; and FIG. 2 which represents schematically an apparatus for detecting velocities of fluid in a conduit.

In FIG. 1 an ultrasonic probe 1 sensitive to frequencies in the range 36 to 44 kHz and comprising a sound sensitive transducer 2, an acoustic shield 3 surrounding the sound sensitive transducer (partly cut away to show the transducer), and a probe case 4 containing a preamplifier is directed to a conduit 5 and spaced away from it such that the sound sensitive transducer 2 is 10 mm. away from the conduit 5. Leads 6 pass from the end of the probe case 4. FIG. 2 shows apparatus for determining the velocity of the fluid in a conduit (and, in broken lines a modification to enable mass flows through the conduit to be determined) comprising two detectors as described in FIGS. 1, 10 and 11, directed to different positions A and B in a conduit 12. Signals from the detectors are passed to amplifiers and signal rectifiers 13 and 14 and from thence to a signal correlator 15 which produces a signal indicating the delay in the reception of a signal by detector 11 after its reception by detector 10.

In use, a fluid passing along conduit 12 produces similar signals in detectors 10 and 11 after a time lag representative of the time taken for the fluid to pass from point A in the conduit to point B. The signals are fed through amplifiers and rectifiers 13 and 14 and passed to correlator 15 which determines this delay. From a knowledge of this delay and the spacing between detectors 10 and 11 the velocity of the fluid in the pipe is determined. This determination may be carried out if desired, for example, by taking readings from a calibrated dial reading in velocities rather than periods of delay.

In the modification of the above apparatus, a radioactive source 20 passes radiation through conduit 12 at a point mid-way between ultrasonic detectors 10 and 11 to a radiation detector 22. Signals from this, after amplification in amplifier 23 are fed to rate meter 24 which is set to produce a potential representative of the density of the fluid. Signals from this and correlator 15 are fed to analog computer 25 which multiplies the velocity of the fluid by its density to produce a signal representative of the mass flow in the conduit which may be displayed or recorded as desired.

I claim:

1. Apparatus for detecting the velocity of a fluid in a conduit which comprises two directional sonic detectors directed toward the conduit at two points spaced apart along the conduit but of which the sound sensitive elements are spaced away from the conduit and means for matching signals received from the two points at different time lags between them to determine the time lag which gives the best match.

2. Apparatus as claimed in claim 1 comprising signal correlator means wherein the signals are matched by correlating signals representing the intensity of the detected sound at the two points by multiplying the downstream signal by an upstream signal received at an earlier time, integrating the product and determining the time lag between the signals which produces the greatest value of the integrated product.

* * * * *